US011901751B2

(12) United States Patent
Chen et al.

(10) Patent No.: US 11,901,751 B2
(45) Date of Patent: Feb. 13, 2024

(54) SYSTEMS AND METHODS FOR MONITORING HIGH CHARGE LEVELS IN RECHARGEABLE BATTERIES

(71) Applicant: Google LLC, Mountain View, CA (US)

(72) Inventors: Michael Jonathon Chen, Mountain View, CA (US); William Alan Saperstein, San Carlos, CA (US); James Robert Lim, Mountain View, CA (US); David Wang, San Jose, CA (US)

(73) Assignee: Google LLC, Mountain View, CA (US)

( * ) Notice: Subject to any disclaimer, the term of this patent is extended or adjusted under 35 U.S.C. 154(b) by 449 days.

(21) Appl. No.: 17/319,815

(22) Filed: May 13, 2021

(65) Prior Publication Data
US 2022/0239134 A1 Jul. 28, 2022

Related U.S. Application Data

(60) Provisional application No. 63/140,720, filed on Jan. 22, 2021.

(51) Int. Cl.
*H01M 10/44* (2006.01)
*H01M 10/46* (2006.01)
*H02J 7/00* (2006.01)

(52) U.S. Cl.
CPC ........ *H02J 7/00308* (2020.01); *H02J 7/0031* (2013.01); *H02J 7/00302* (2020.01); *H02J 7/007182* (2020.01)

(58) Field of Classification Search
CPC .. H02J 7/00302; H02J 7/00308; H02J 7/0048; H02J 7/0031; H02J 7/0047; H02J 7/007182
(Continued)

(56) References Cited

U.S. PATENT DOCUMENTS 5,672,953 A 9/1997 Kim
6,549,014 B1 * 4/2003 Kutkut ............... G01R 31/3828
324/426

(Continued)

OTHER PUBLICATIONS

Texas Instruments, "System-Side Impedance Track Fuel Gauge With Direct Battery Connection", retrieved from www.ti.com, Apr. 2009, 40 pp.

(Continued)

*Primary Examiner* — Edward Tso
(74) *Attorney, Agent, or Firm* — Colby Nipper PLLC

(57) ABSTRACT

An indexed sequence of bits in a buffer is allocated for tracking a battery charging state. The indexed sequence of bits has a first number of bits. A battery voltage of a rechargeable battery is sampled at a sampling rate. For each sampled battery voltage, the battery voltage is compared with a voltage threshold. A next bit position in the indexed sequence of bits is identified. In accordance with a determination that a comparison result is true, a predefined first value is added to the next bit position. A second number of bits that are filled with the predefined first value is determined. A ratio between the second number and the first number is also determined. In accordance with a determination that the ratio exceeds a threshold step-down ratio, a battery charge voltage is stepped down. The rechargeable battery is charged to a step-down voltage.

20 Claims, 8 Drawing Sheets

(58) Field of Classification Search
USPC ....... 320/106, 107, 110, 114, 132, 134, 136, 320/148
See application file for complete search history.

(56) References Cited

U.S. PATENT DOCUMENTS

| | | | | |
|---|---|---|---|---|
| 7,579,842 B2* | 8/2009 | Hunter | ................ | H02J 7/0047 324/426 |
| 2003/0139888 A1* | 7/2003 | Burns | .................... | H02J 7/005 702/63 |
| 2007/0075682 A1 | 4/2007 | Guang et al. | | |
| 2013/0041607 A1* | 2/2013 | Zimmerman | .... | G01R 19/16542 702/63 |
| 2016/0064960 A1 | 3/2016 | DiCarlo et al. | | |
| 2018/0342774 A1* | 11/2018 | Shimada | ........... | H01M 10/4285 |

OTHER PUBLICATIONS

"International Search Report and Written Opinion", Application No. PCT/US2022/013304, dated Apr. 20, 2022, 10 pages.
"International Preliminary Report on Patentability", Application No. PCT/US2022/013304, dated Jul. 20, 2023, 7 pages.

\* cited by examiner

SYSTEMS AND METHODS FOR MONITORING HIGH CHARGE LEVELS IN RECHARGEABLE BATTERIES

RELATED APPLICATION

This application claims benefit of U.S. Provisional Application No. 63/140,720 filed Jan. 22, 2021, the entire contents of which are hereby incorporated by reference.

TECHNICAL FIELD

This application relates generally to battery technology including, but not limited to, methods and systems for monitoring charge levels of a rechargeable battery in an electronic device and protecting the rechargeable battery from damage caused by being kept on a charger for too long.

BACKGROUND

Rechargeable batteries, such as lithium-ion batteries, are commonly used in electronic devices. When a battery is kept on a charger for too long, overcharge conditions can lead to battery swelling due to the build-up of heat and gas inside the battery. This failure state can cause fires, destroy the product, cause damage to a user's home, or injure the user.

A rechargeable battery can be equipped with charger integrated circuits (ICs) and fuel gauge ICs, which inform a user about a charge state of the battery. When the battery is full, the ICs generally terminate the charge current but continue to supply a small trickle current to keep the battery full. When the battery is kept on a trickle charge for a long period of time, swelling occurs. Thus, currently available charger and field gauge technologies do not prevent battery swelling. Accordingly, there is a need for simple and cost-effective solutions to monitor a charge level of a rechargeable battery and to protect the battery and its accompanying device and user from damage caused by continuous periods of charging.

SUMMARY

This disclosure describes methods and systems for monitoring a charge level of a rechargeable battery. In some implementations, the rechargeable battery includes a battery charger. The battery also includes a microcontroller unit (MCU) that compares a voltage of the battery against a predefined threshold voltage at each sampling period (e.g., every minute, every five minutes, etc.) over a time window (e.g., five days, a week, ten days, etc.). The MCU utilizes a bit array to implement a sliding window. Each bit of the array represents whether the battery voltage is above the threshold voltage while it is charging. In some implementations, the MCU sets the bit to "1" if the battery voltage is greater than the threshold voltage, and sets the bit to "0" if it is less than or equal to the threshold voltage.

In some implementations, the number of bits (e.g., cells) in the bit array is based on a time duration for monitoring the battery. For example, a 11520-bit (or 1440-byte) array is needed for monitoring a battery over eight days and at sampling rate of one minute. The required number of bits (and/or bytes) are allocated in the buffer for tracking the battery charging state for eight consecutive days. In some implementations, using a bit array helps keep the memory requirements low so it fits in the constraints of a small MCU. For each sample, all the bits in the bit array are shifted by one, thus making it a sliding window. In some implementations, when a number of bit "one" in the array is above a threshold (e.g., 50%), the MCU decreases the maximum voltage of a charger to a lower stepdown voltage.

In one aspect of the present disclosure, a method is implemented for charging a battery. The method comprises allocating an indexed sequence of bits in a buffer for tracking a battery charging state. The indexed sequence of bits having a first number of bits. The method also comprises sampling a battery voltage of a rechargeable battery at a sampling rate. For each sampled battery voltage, the battery voltage is compared with a voltage threshold. A next bit position in the indexed sequence of bits is identified. In accordance with a determination that a comparison result is true, a predefined first value is added to the next bit position in the indexed sequence of bits. A second number of bits that are filled with the predefined first value is determined. A ratio between the second number and the first number is also determined. In accordance with a determination that the ratio exceeds a threshold step-down ratio, stepping down a battery charge voltage is stepped to, to which the rechargeable battery is charged to a step-down voltage.

In another aspect, some implementations include determining whether the rechargeable battery is connected to a charger source. The predefined first value is added to the next bit position in accordance with a determination that the comparison result is true and that the rechargeable battery is connected to the charger source. For each sampled battery voltage, in accordance with a determination that the rechargeable battery is not connected to a charger source, adding a predefined second value to the next bit position in the indexed sequence of bits.

Thus, systems, devices, and methods are provided to monitor a voltage level of a rechargeable battery. Systems, devices, and methods that reduce a battery charge voltage are also disclosed. As such, this application provides simple and cost-effective solutions of detecting rechargeable batteries that may be vulnerable to damage due to being charged for too long at high voltage (e.g., near their maximum voltage limit), thereby preventing the swelling problem.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Figure 1:
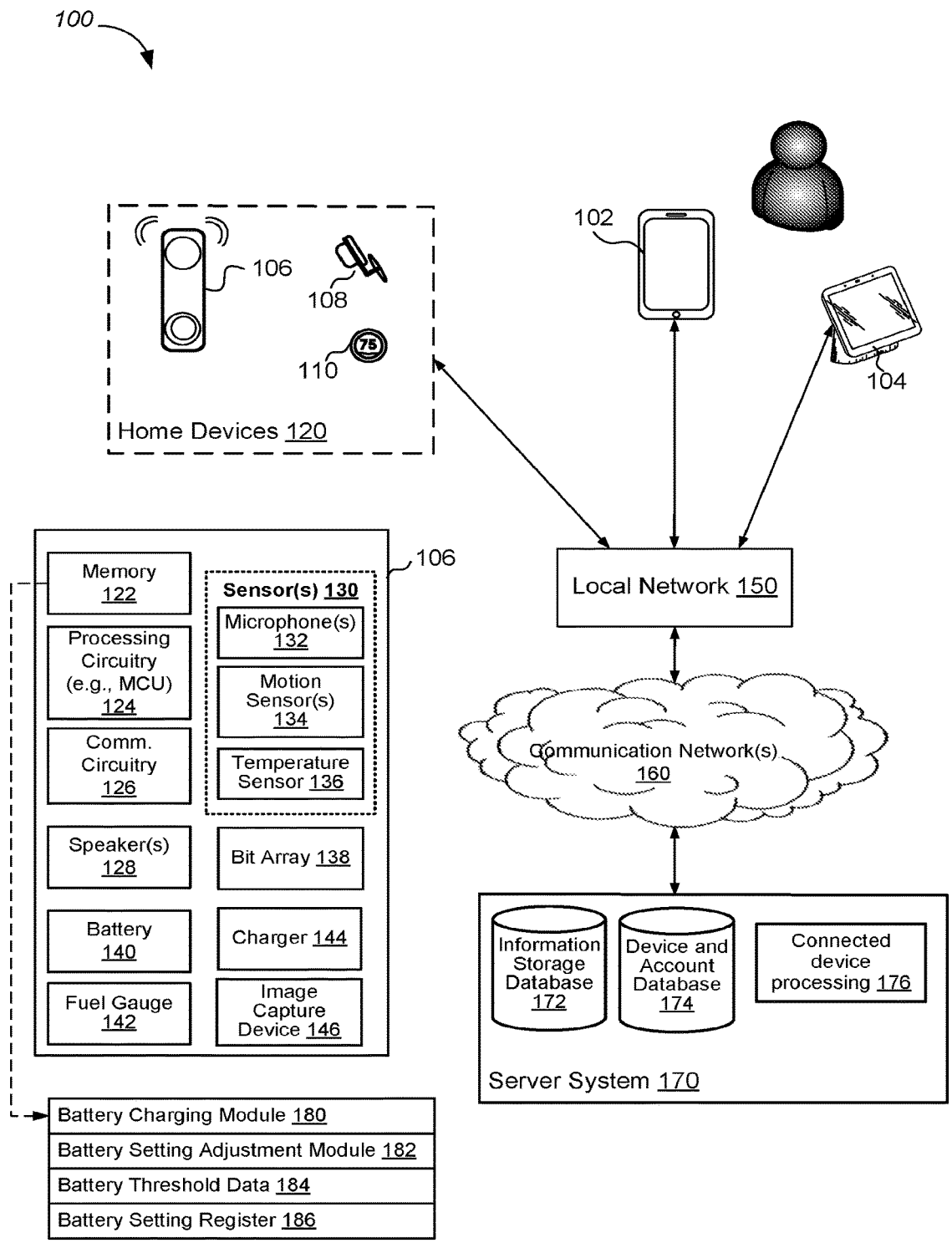
FIG. 1 illustrates an exemplary operating environment in accordance with some implementations.

FIG. 1 illustrates an exemplary operating environment 100 in accordance with some implementations. In some implementations, the operating environment 100 comprises a home environment that is connected to a remote server system 170. The operating environment 100 includes various devices (also referred to herein as "connected" or "integrated" devices) that are interconnected via a local network 150. In some implementations, the devices include a mobile device 102, a display assistant device 104, and home devices 120. In some implementations, the home devices 120 include one or more of: a connected doorbell/camera 106, a camera 108, and a thermostat 110. The connected doorbell/camera 106 alerts the user to the presence of people and/or packages at the front door and monitors activity at the front door. The camera 108 may be part of a home security system that allows the user to track activity around the operating environment 100. The thermostat 112 detects ambient climate characteristics (e.g., temperature and/or humidity) and controls a heating, ventilation, and air conditioning (HVAC) system (not shown) of the operating environment 100 accordingly.

By virtue of network connectivity, a user may control the connected devices in the operating environment 100 even if the user is not proximate to the devices. As one example, the user may use the display assistant device 104 to view or adjust a current set point temperature of the thermostat 110 (e.g., via the local network 150 and through a communication circuitry of the display assistant device 104). In some implementations, the display assistant device 104 includes program modules that can control the home devices 120 without user interaction. As another example, the camera 108 may store video data locally and wirelessly stream video data to the mobile device 102 or the display assistant device 104 via communication network(s) 160 and/or the local network 150.

In some implementations, at least a subset of the connected devices are also communicatively coupled to a server system 170 through communication network(s) 160. The sever system 170 includes one or more of: an information storage database 172, a device and account database 174, and a connected device processing module 176. For example, the camera 108 may stream video data to the server system 170 via the communication network(s) 160 for storage on the server system 170 (e.g., the information storage database 172) or for additional processing by the server system 170. The user may access the stored video data using the mobile device 102 (or the display assistant device 104) via the communication network(s) 160.

In some implementations, the user establishes a user account (e.g., a Google™ user account) with the server system 170 and associates (e.g., adds and/or links) one or more connected devices with the user account. The server system 170 stores information for the user account and associated devices in the device and account database 174.

In some implementations, the server system 170 enables the user to control and monitor information from the connected home devices 120 via the connected device processing module 176 (e.g., using an application executing on the mobile device 102 or assistant capabilities of some of the home devices 120). The user can also link the display assistant device 104 to one or more of the connected home devices 120 via the user account. This allows program modules executing on the display assistant device 104 to receive information collected by the home devices 120 via the server system 170, or send commands via the server system 170 to the home devices 120.

In some implementations, the connected doorbell/camera 106 includes memory 122, processing circuitry 124, communication circuitry 126 (e.g., network interface(s)), speakers 128, and sensor(s) 130. Further, in some implementations, the connected doorbell/camera 106 includes a bit array 138 that includes an indexed sequence of bits that is stored by the memory 122. The connected doorbell/camera 106 also includes a rechargeable battery 140, a charger 144 for charging the rechargeable battery 140, and a fuel gauge 142 (e.g., a fuel gauge IC) for determining a state of charge of the battery 140. In some implementations, the rechargeable battery 140 is built into the connected doorbell/camera 106 or is a replaceable module in the connected doorbell/camera 106.

The memory 122 stores programs that, when executed by elements of the processing circuitry 124, perform one or more of the functions described with reference to FIGS. 1 to 8. For example, in some implementations, the stored programs include a battery charging module 180 that determines a battery charge voltage at which the rechargeable battery 140 is to be charged. Specifically, in some implementations, the battery charging module 180 samples a voltage of the rechargeable battery 140 at a sampling rate (e.g., once every minute, once every three minutes etc.). For each sampled battery voltage, the battery charging module 180 compares the battery voltage with a voltage threshold. The battery charging module 180 identifies in the bit array 138 a next bit position in the indexed sequence of bits. In accordance with a determination that a comparison result is true (e.g., the battery voltage exceeds the voltage threshold), the battery charging module 180 adds a predefined first value (e.g., bit "1") to the next bit position in the indexed sequence of bits. The battery charging module 180 determines a ratio of (i) a number of bits in the indexed sequence of bits that are filled with the predefined first value and (ii) a total number of bits in the indexed sequence of bits. In accordance with a determination that the ratio exceeds a threshold step-down ratio (e.g., 1:2), the battery charging module 180 steps down (e.g., decreases) a battery charge voltage to which the rechargeable battery 140 is charged to a step-down voltage.

In some implementations, the stored programs include a battery setting adjustment module 182 for adjusting a setting (e.g., a threshold voltage, a battery charge voltage etc.) of the rechargeable battery 140. The memory 122 also stores battery threshold data 184 and a setting register 186 of the rechargeable battery 140.

The sensor(s) 130 are integrated into the connected doorbell/camera 106, and include one or more of: microphone(s) 132, motion sensor(s) 134, and a temperature sensor 136. The sensor(s) 130 detect and record sound, movement, and/or ambient conditions (e.g., temperature) in proximity to the connected doorbell/camera 106. In some implementations, the connected doorbell/camera 106 also includes an image capture device 146, for recording images and video footage of a surrounding of the connected doorbell/camera 106. In some implementations, each of the recorded events (e.g., from the sensor(s) 130 and the image capture device 146) is associated with a respective date stamp and time-stamp. In some implementations, the recorded events are stored and processed locally on the connected doorbell/camera 106. In some implementations, the connected doorbell/camera 106 sends at least a subset of the recorded events to the server system 170 via the communication network(s) 160 for storage and processing.

Figure 2:
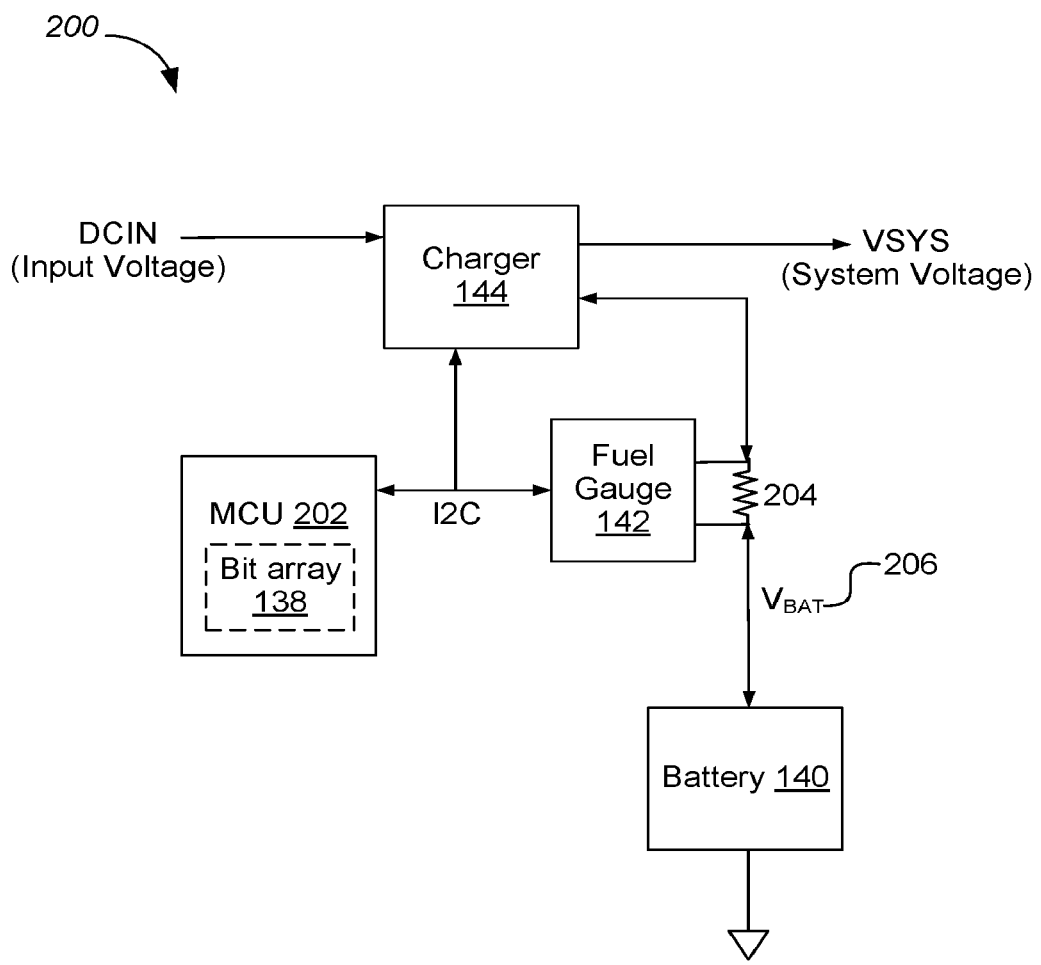
FIG. 2 illustrates a block diagram of a rechargeable battery in accordance with some implementations.

FIG. 2 illustrates a block diagram 200 of a connected doorbell/camera 106 in accordance with some implementations.

In some implementations, the connected doorbell/camera 106 includes a microcontroller unit (MCU) 202 that is electrically coupled to a charger 144 and a fuel gauge 142. The MCU 202 includes various components of the connected doorbell/camera 106, including the memory 122, the processing circuitry 124, the communication circuitry 126, and the bit array 138 that are discussed with respect to FIG. 1. The fuel gauge 142 measures a voltage supplied to a battery 140 (e.g., $V_{BAT}$ 206) by measuring a voltage drop across a resistor 204.

In some implementations, the MCU 202 regularly polls a state of the charger 144 to determine whether the charger is connected to the battery 140.

In some implementations, the MCU 202 regularly polls the fuel gauge 142.

For example, at each sampling period (e.g., every second), the MCU 202 obtains from the fuel gauge 142 the voltage of the battery 140 (e.g., $V_{BAT}$ 206) and compares it with a threshold voltage (e.g., $V_{TH}$ 404). The MCU 202 tracks how long the voltage of the battery 140 has been above the threshold voltage by determining a ratio of a number of bits in an indexed sequence of bits in the bit array 138 that are filled with the predefined first value and a total number of bits in the indexed sequence of bits in the bit array 138, as discussed above with respect to FIG. 1. In some implementations, the MCU 202 regulates a maximum allowable voltage (e.g., $V_{BC}$ 402) of the charger 144 to a lower stepdown voltage (e.g., $V_{SD}$ 406) in accordance with a determination that the ratio exceeds a threshold ratio.

Figure 3:
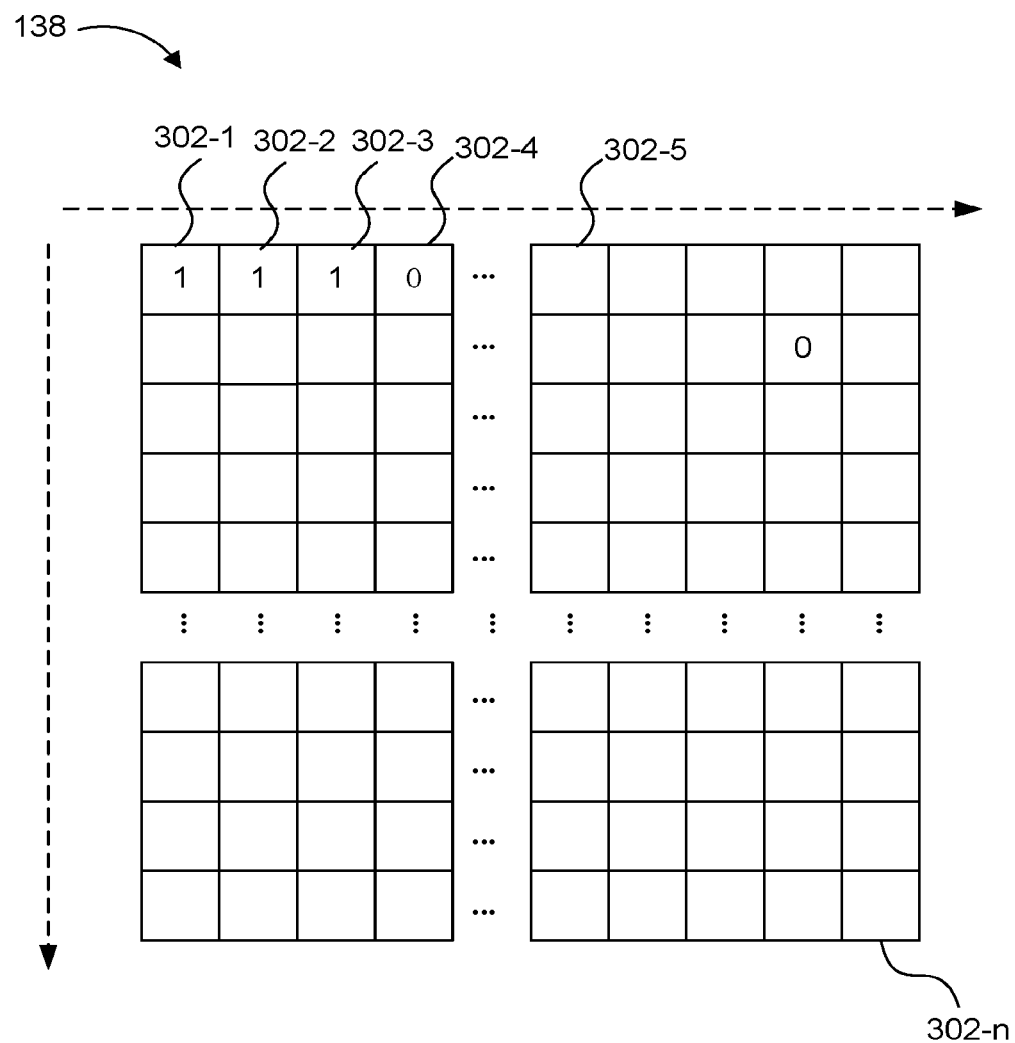
FIG. 3 illustrates a bit array in accordance with some implementations.

FIG. 3 illustrates a bit array 138 in accordance with some implementations.

In the example of FIG. 3, the bit array 138 contains an indexed sequence of n bits 302-1 to 302-n. Each of the bits 302 corresponds to a respective sampling period (e.g., one second). The entry in each bit 302 represents whether the battery voltage (e.g., $V_{BAT}$ 206) is above the threshold voltage (e.g., $V_{TH}$ 404) at the sampling period. In some implementations, an entry "1" (see, e.g., bits 302-1 to 302-3) denotes that the battery voltage is above the threshold voltage. An entry "0" (see, e.g., bit 302-4) indicates that the battery voltage is equal to or less than the threshold voltage.

In some implementations, the number of bits in the array 138 is based on a fixed time duration that is monitored by the MCU 202. For example, a time duration of one week (e.g., 7 days), at a sampling rate of once per minute, requires an array of 10080 bits or 1260 bytes.

Figure 7:
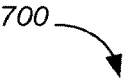
FIG. 7 illustrates exemplary product life expectancies, polling frequencies, window durations/sizes, maximum voltages, threshold voltages, stepdown voltages, and respective threshold ratios for switching a maximum charging voltage to a stepdown voltage for batteries of different applications, in accordance with some implementations.

In some implementations, the bits in the bit array 138 corresponds to a sliding time window in which the battery voltage is sampled at the sampling rate, and the sliding time window covers a fixed length of time determined based on the sampling rate. FIG. 7 illustrates representative window durations/sizes for batteries of different applications, at sampling rate (e.g., polling frequency) of one minute. Using the "Battery in Camera" in FIG. 7 as an example, a bit array of 11520 bits (e.g., n=11520), or 1440 bytes, is required for a time window of 8 days at a sampling rate of one minute. In this example, the bits in the bit array are filled up sequentially, starting from 302-1. In some implementations, if the time monitored by the MCU 202 exceeds the time window, the oldest bits are replaced. Thus, in this example, after the bit 302-n is filled, the next bit replaces the oldest bit 302-1.

Figure 4:
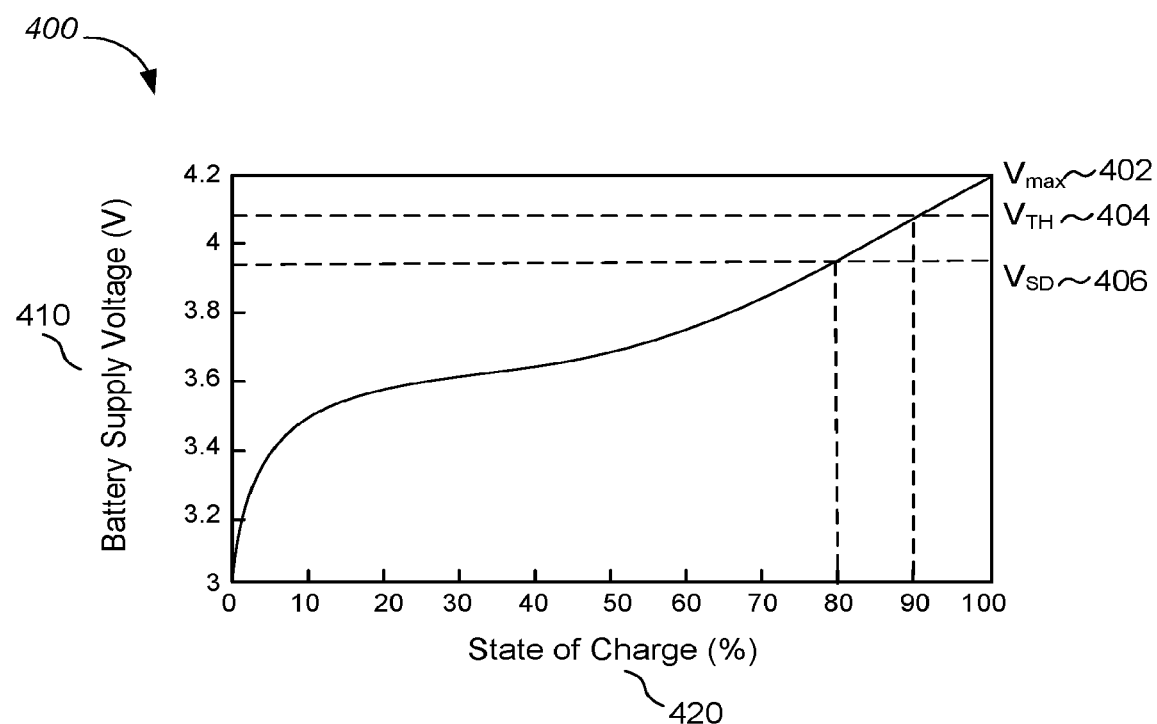
FIG. 4 is an exemplary plot illustrating the effects of battery supply voltage on the state of charge of a battery in accordance with some implementations.

FIG. 4 is an exemplary plot 400 illustrating the effects of battery supply voltage 410 on the state of charge 420 of a battery 140 in accordance with some implementations. In some implementations, the battery supply voltage 410 is a voltage that is supplied by a charger 144. In some implementations, the battery 140 is configured to be charged by a solar powered battery charger.

FIG. 4 illustrates that the battery supply voltage includes a voltage limit 402 (e.g., $V_{BC}$), a threshold voltage 404 (e.g., $V_{TH}$), and a stepdown voltage 406 (e.g., $V_{SD}$). In some implementations, the voltage limit 402 is the maximum allowable voltage supplied by the charger 144 (e.g., $V_{BC}$~4.2 in FIG. 4). The battery supply voltage is capped at the voltage limit 402. A battery can become fully charged (e.g., 100% state of charge) when it is charged at the voltage limit 402. In some implementations, the threshold voltage 404 is the battery supply voltage required to achieve a 90% state of charge for the battery 140. In the example of FIG. 4, the threshold voltage 404 is $V_{TH}$~4.1 V. In some implementations, if a sampled battery voltage is above the threshold voltage, the MCU 202 assigns a predefined first value (e.g., value "1") to a bit corresponding to the sampled voltage (e.g., a next bit position in the bit array 138). If the sampled battery voltage is equal to or less than the threshold voltage, the MCU 202 assigns a predefined second value (e.g., "0") to the bit.

In some implementations, the MCU 202 further determines (e.g., by polling the charger 144), whether the rechargeable battery 140 is connected to a charger source. In some implementations, the predefined first value is added to the next bit position in accordance with the determination that sampled battery voltage is above the threshold voltage and that the rechargeable battery is connected to the charger source.

In some implementations, the stepdown voltage 406 is the battery supply voltage required to achieve an 80% state of charge for the battery 140. In the example of FIG. 4, the stepdown voltage 406 is $V_{SD}$~3.9 V. In some implementations, the MCU 202 determines a ratio of a number of bits in the bit array 138 that have the predefined first value to the total number of bits in the bit array 138 that are filled (e.g., that contain either the first predefined value or the second predefined value). In accordance with a determination that the ratio exceeds a threshold step-down ratio (e.g., 50%), the processing circuitry 124 steps down the battery supply voltage from the voltage limit 402 to the stepdown voltage 406. In some implementations, by limiting the battery supply voltage to less than the maximum allowable voltage, the battery 140 does not become fully charged. Accordingly, the problem of battery swelling is reduced.

Figure 5:
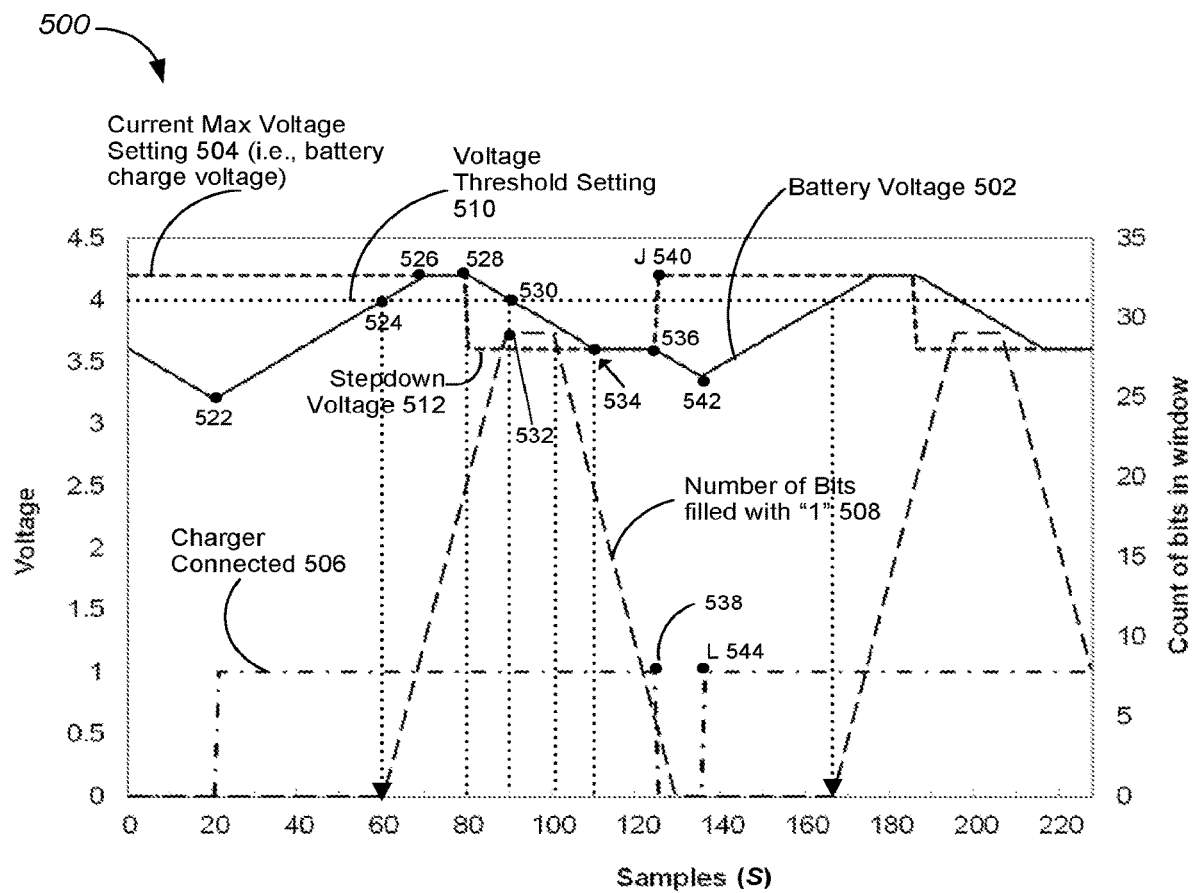
FIG. 5 illustrates an exemplary charging cycle of a battery in accordance with some implementations

FIG. 5 illustrates an exemplary charging cycle 500 of a battery 140 in accordance with some implementations. In this example, the battery 140 comprises a current maximum voltage setting 504 that includes a full charge voltage (e.g., 4.2 V) and a stepdown voltage 512 (e.g., 3.5 V). The battery 140 also comprises a threshold voltage setting 510 (e.g., 4.0 V). The initial battery voltage S=0 is about 3.5 V.

In some implementations, a value (e.g., "0" or "1") is added to the bit array 138 in accordance with a determination that the battery 140 is connected to a charger source. FIG. 5 shows that the battery 140 is not connected to a charger source (e.g., the charger is not connected to a power source) from S=0 to S=20. Therefore, the bit array 138 has a count of zero from S=0 to S=20. At the same time, the battery voltage 502 also decreases because it is not charged.

In the example of FIG. 5, the battery 140 starts charging from S=20, when the charger is connected. The battery voltage 502 increases (e.g., linearly) from voltage 522 at S=20, to voltage 524 at S=60. During the same time, the number of bits filled with "1" (508) remains at zero because the battery voltage 502 is less than the threshold voltage setting 510. At S=60, the battery voltage 502 reaches the threshold voltage setting 510. Accordingly, the MCU 202 assigns a value of "1" to subsequent bits in the bit array 138 from S=60. This corresponds to an increase in the number of bits filled with "1" starting from S=60. The battery voltage 502 also increases from voltage 524 at S=60 to voltage 526 at S 70, where the full charge voltage of 4.2 V is reached. The battery voltage 502 remains constant at the full charge voltage (e.g., voltage 526).

With continued reference to the example of FIG. 5, at S=80 (e.g., voltage 528), the ratio of the number of bits in the array 138 with value "1" to the number of bits in the array 138 that have been filled reaches a threshold ratio (e.g., 50%, 60% etc.). Accordingly, in some implementations, the processing circuitry 124 decreases current maximum voltage setting from the full charge voltage (e.g., 4.2 V) to a stepdown voltage 512 (e.g., 3.5 V). FIG. 5 shows that the voltage of the battery decreases from voltage 528 as a result of the reduction in current maximum voltage setting. FIG. 5 also shows that the number of bits filled with "1" 508 continues to increase from S=80 to S=90, because the battery voltage at S=80 (e.g., voltage 528) is still above the threshold voltage setting 510. At S=90, the battery voltage decreases to voltage 530, which is below the threshold voltage setting 510. Subsequent voltages that are sampled by the MCU 202 are assigned a bit value "0" due to the battery voltage being lower than the threshold voltage. FIG. 5 shows that a number 532 of bits having the value "1" is constant from S~90 to S~100. Furthermore, with the reduction in the current maximum voltage setting at S=80, the battery voltage decreases from voltage 528 at S=80 to voltage 534 at S~110, and remains constant at the stepdown voltage 512 thereafter.

FIG. 5 also illustrates that the charger is electrically disconnected at S~125 (538). In some implementations, when the charger is disconnected, the maximum voltage setting is reset from the stepdown voltage 512 (e.g., 3.5 V) to the full charge voltage (e.g., 4.2). In this example, the disconnecting of the charger causes the maximum voltage setting to restored to the full charge voltage of 4.2 V (540). However, the battery voltage continues to decrease from voltage 536 to voltage 542 due to discharge of the battery. At S~130 (544), the charger is connected again. This restarts the battery charging cycle.

Figure 6:
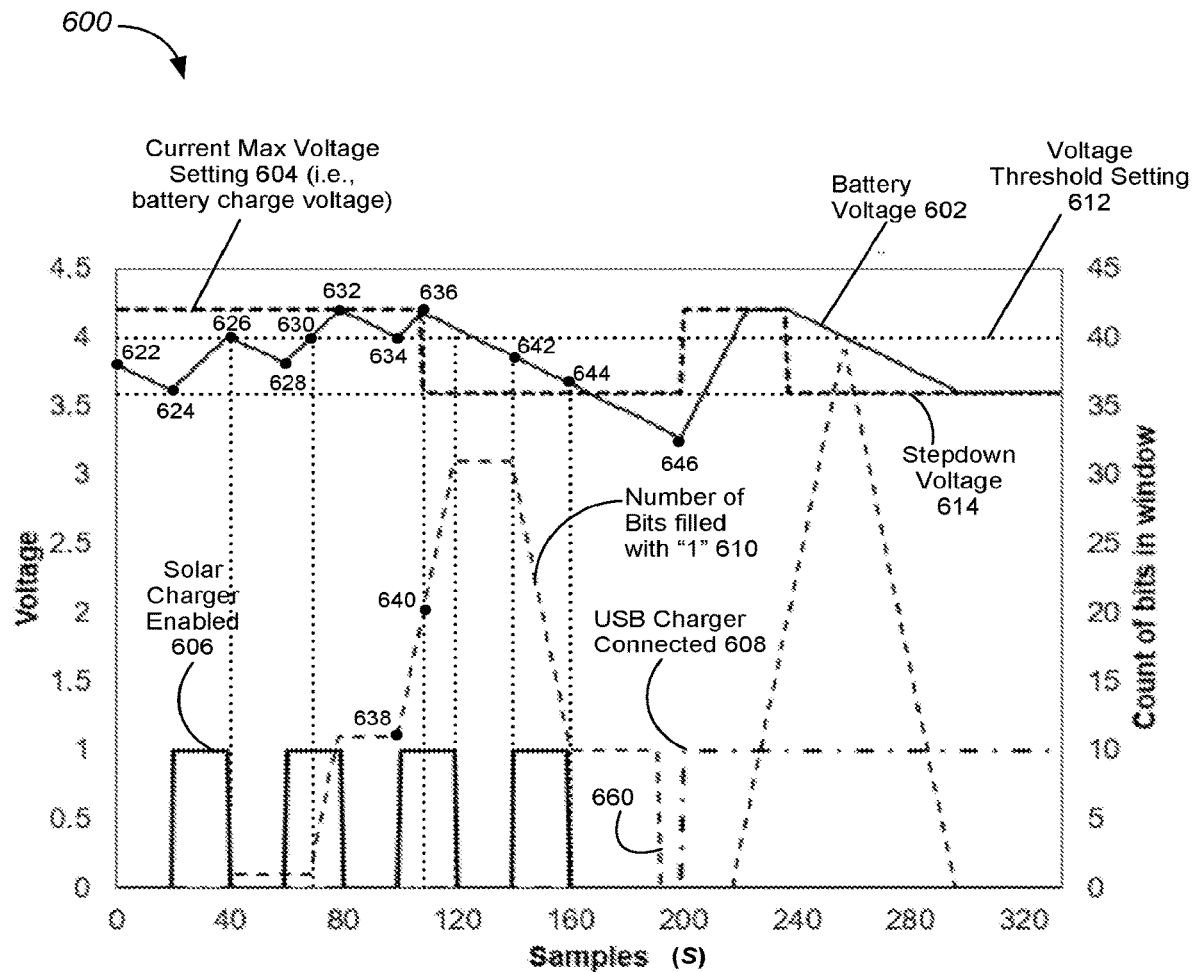
FIG. 6 illustrates an exemplary charging cycle of a battery that is connected to a solar powered charger in accordance with some implementations.

FIG. 6 illustrates an exemplary charging cycle 600 of a battery 140 that is connected to a solar powered charger in accordance with some implementations.

In this example, the battery 140 comprises a current maximum voltage setting 604 that includes a full charge voltage (e.g., 4.2 V) and a stepdown voltage 614 (e.g., 3.5 V). The battery 140 also comprises a threshold voltage setting 612 (e.g., 4.0 V). In some implementations, the solar powered charger may cycle on and off during the day due to the presence or absence of sunlight. In the example of FIG. 6, the solar powered charger is enabled from S=20 to S=40, S=60 to S=80, S=100 to S=120, and S=140 to S=160, disabled from S=0 to S=20, S=40 to S=60, S=80 to S=100, and S=120 to S=140.

The battery 140 has a starting battery voltage of ~3.7 V (622) at S=0. From S=0 from S=20, the charger is disabled (e.g., due to lack of sunlight). The battery voltage decreases from voltage 622 to voltage 624 due to discharge of the battery 104. From S=20 to S=40, the solar powered charger is enabled (e.g., due to presence of sunlight) and charges the battery 140, thus leading to an increase in the battery voltage from 624 to 626. During the same time period, the number of bits filled with "1" (610) remains at zero because the battery voltage is less than the threshold voltage setting 612.

At S=40, the battery voltage 602 reaches (e.g., exceeds) the threshold voltage setting 612. FIG. 6 illustrates a slight increase in the number of bits filled with "1" (610) from S~40 due to the battery voltage 602 exceeding the threshold voltage setting 612 and the solar powered charger being enabled. From S~40 to S=60, the number of bits filled with "1" (610) remains constant because the charger is not enabled. During the same time, there is a decrease in the battery voltage from voltage 626 to voltage 628.

From S=60 to S=80, the charger is enabled. FIG. 6 shows that the number of bits filled with "1" (610) remains constant from S=60 to S=70 due to the battery voltage being lower than the threshold voltage setting 612. From S=70 to S=80, the number of bits filled with "1" (610) increases from because the battery voltage (e.g., voltage 630 at S=70 and voltage 632 at S=80) exceeds the threshold voltage.

From S=80 to S=100, the solar powered charger is disabled. FIG. 6 shows a decrease in the battery voltage from voltage 632 to voltage 634 during this time. The number of bits filled with "1" remains constant during this time because the charger is disabled.

At S=100, the charger is enabled and charges the battery 140. The voltage of the battery 140 increases from voltage 634 at S=100 to the current maximum voltage setting at S~110 (636). During this time, the number of bits filled with "1" also increases (e.g., from count 638 to count 640) due to the battery voltage 602 exceeding the threshold voltage 612. In some implementations, at count 640, the ratio of the number of bits in the array 138 with value "1" to the number of bits in the array 138 that have been filled reaches a threshold ratio (e.g., 50%, 60%, or 80%). In some implementations, in accordance with a determination that the ratio has reached (e.g., exceeded) a threshold ratio the processing circuitry 124 decreases the current maximum voltage setting from the full charge voltage (e.g., 4.2 V) to the stepdown voltage 614 (e.g., 3.5 V).

As also illustrated in FIG. 6, the charger is disabled from S=120 to S=140 (e.g., due to the absence of sunlight). The number of bits filled with "1" remains constant during this time due to the charger being disabled. From S=140 to S=160, even though the charger is enabled (e.g., due to the presence of sunlight), the battery voltage continues to decrease (e.g., from voltage 642 to voltage 644) because the current maximum voltage setting is at the stepdown voltage value (e.g., 3.5 V). The battery voltage continues to decrease from S=160 (e.g., voltage 644) to S=200 because the charger is not enabled.

In some implementations, the processing circuitry 124 steps up the battery charge voltage from the stepdown voltage 614 to the full charge voltage (e.g., 4.2) in accordance with a determination that the rechargeable battery 140 is connected to a non-solar powered charger source. FIG. 6 illustrates that at S=200, the battery 140 is connected to a USB charger (608). Accordingly, the processing circuitry 124 increases the current maximum voltage setting from the stepdown voltage 612 to full charge voltage (e.g., 4.2).

FIG. 7 illustrates exemplary product life expectancies, polling frequencies, window durations/sizes, maximum voltages, threshold voltages, stepdown voltages, and respective threshold ratios for switching a maximum charging voltage to a stepdown voltage for batteries of different applications, in accordance with some implementations.

Figure 8:
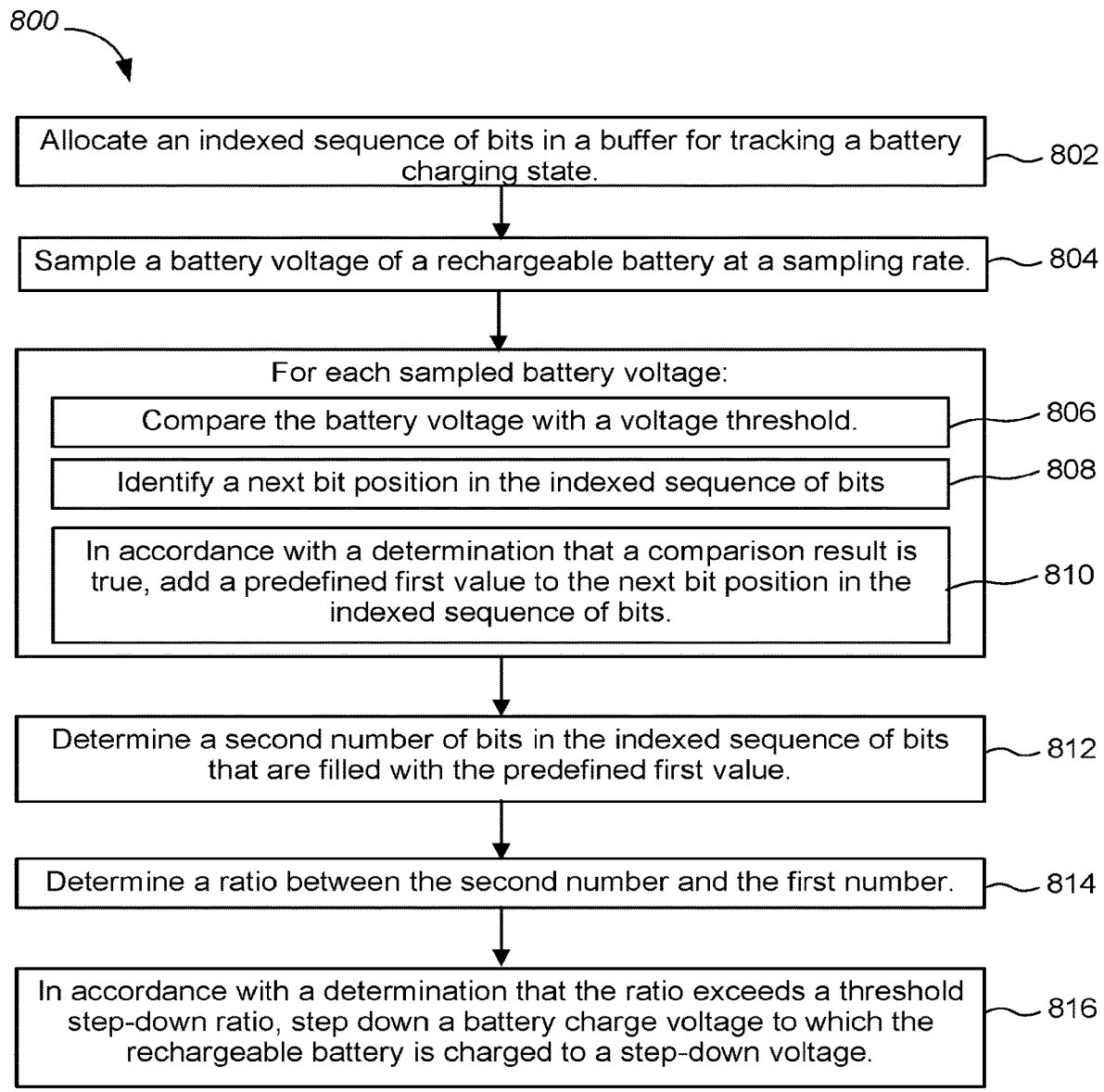
FIG. 8 illustrates a flowchart of a method in accordance with some implementations.

In the example of FIG. 7, each of the applications includes a polling frequency of once per minute. In some implementations, one or more of the voltage threshold, stepdown voltage, sampling rate, value of first predefined bit, and threshold step-down ratio are customized for the rechargeable battery based on at least one of: a type, a location, and a season of the electronic device. For instance, in some implementations, a battery in a camera (e.g., a connected doorbell/camera 106) includes a window duration of eight days. At a sampling rate of once per minute, a total of 11520 bits (or 1440 bytes) are required. In some implementations, 1440 bytes are allocated in a buffer of the memory 122 for tracking the battery charging state for eight consecutive days FIG. 8 illustrates a flowchart of a method 800 in accordance with some implementations. Method 800 is, optionally, governed by instructions that are stored in a non-transitory computer readable storage medium (e.g., memory 122 in FIG. 1) and that are executed by one or more processors of an electronic device 106. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in method 800 may be combined and/or the order of some operations may be changed. In some implementations, the electronic device 106 is disposed in an outdoor environment, and includes a rechargeable battery 140. Optionally, the electronic device 106 is disconnected from an external power source and entirely powered by the rechargeable battery 140, which can be charged when the electronic device 106 is connected to the external power source. Optionally, the electronic device 106 is constantly connected to the external power source and charged at a charge rate using the methods described with respect to FIGS. 2 to 6.

The electronic device 106 allocates (802) an indexed sequence of bits in a buffer for tracking a battery charging state. The indexed sequence of bits has a first number of bits. In some implementations, the indexed sequence of bits are bits of a bit array 138. In some implementations, and as illustrated in FIG. 7, the first number of bits is based on a sampling rate and a time duration for which the battery 140 is to be monitored.

The electronic device 106 samples (804) a battery voltage of a rechargeable battery at a sampling rate (e.g., every minute, every three minutes, every five minutes etc.).

For each sampled battery voltage, the electronic device 106 compares (806) the battery voltage with a voltage threshold. The electronic device 106 also identifies (808) a next bit position in the indexed sequence of bits.

In accordance with a determination that a comparison result is true, the electronic device 106 adds (810) a predefined first value to the next bit position in the indexed sequence of bits.

The electronic device 106 determines (812), in the indexed sequence of bits, a second number of bits that are filled with the predefined first value.

The electronic device 106 also determines (814) a ratio between the second number and the first number.

In accordance with a determination that the ratio exceeds a threshold step-down ratio (e.g., 50%, 60%, 75% etc.), the electronic device 106 steps down (816) a battery charge voltage to which the rechargeable battery is charged to a step-down voltage.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof

What is claimed is:

1. A battery charging method, comprising:
   allocating an indexed sequence of bits in a buffer for tracking a battery charging state, the indexed sequence of bits having a first number of bits;
   sampling a battery voltage of a rechargeable battery at a sampling rate;
   for each sampled battery voltage:
   comparing the battery voltage with a voltage threshold;

identifying a next bit position in the indexed sequence of bits; and in accordance with a determination that a comparison result is true, adding a predefined first value to the next bit position in the indexed sequence of bits;

determining, in the indexed sequence of bits, a second number of bits that are filled with the predefined first value;

determining a ratio between the second number and the first number; and in accordance with a determination that the ratio exceeds a threshold step-down ratio, stepping down a battery charge voltage to which the rechargeable battery is charged to a step-down voltage.

2. The method of claim 1, further comprising:

determining whether the rechargeable battery is connected to a charger source, wherein the predefined first value is added to the next bit position in accordance with a determination that the comparison result is true and that the rechargeable battery is connected to the charger source; and for each sampled battery voltage, in accordance with a determination that the rechargeable battery is not connected to a charger source, adding a predefined second value to the next bit position in the indexed sequence of bits.

3. The method of claim 1, wherein identifying the next bit position in the indexed sequence of bits further comprises:

in accordance with a determination that the indexed sequence of bits have been fully filled, identifying the next bit position as a position of an earliest bit that has been filled in the indexed sequence of bits, wherein a value stored in the earliest bit is replaced by the predefined first value.

4. The method of claim 1, wherein the indexed sequence of bits are filled and overwritten by samples of the battery voltage consecutively according to a predefined order.

5. The method of claim 1, further comprising:

for each sampled battery voltage, in accordance with a determination that the comparison result is false, adding a predefined second value distinct from the predefined first value in the next bit position in the indexed sequence of bits.

6. The method of claim 5, wherein the predefined first value is "1", and the predefined second value is "0".

7. The method of claim 1, wherein the battery voltage is consecutively sampled at the sampling rate regardless of whether the rechargeable battery is being charged.

8. The method of claim 1, wherein the rechargeable battery is configured to be charged by a solar powered battery charger.

9. The method of claim 1, wherein determination that the comparison result is true further comprises determining that the battery voltage is one of: (a) greater than the voltage threshold and (b) greater than or equal to the voltage threshold.

10. The method of claim 1, wherein the voltage threshold is greater than the step-down voltage.

11. The method of claim 1, wherein the voltage threshold includes a first voltage threshold, further comprising:

in accordance with a determination that the rechargeable battery is disconnected from a charger source, stepping up the battery charge voltage from the step-down voltage to a full charge voltage, the full charge voltage being greater than the voltage threshold.

12. The method of claim 1, wherein the indexed sequence of bits corresponds to a sliding time window in which the battery voltage is sampled at the sampling rate, and the sliding time window covers a fixed length of time determined based on the sampling rate and the first number of bits allocated to for tracking the battery charging state.

13. The method of claim 1, wherein the rechargeable battery is integrated in an electronic device having one or more processors, the buffer storing the indexed sequence of bits, and memory having instructions stored thereon.

14. The method of claim 13, wherein one or more of the voltage threshold, step-down voltage, sampling rate, first number, and threshold step-down ratio are customized for the rechargeable battery based on at least one of: a type, a location, and a season of the electronic device.

15. An electronic device, comprising:

one or more processors; and memory having instructions stored thereon, which when executed by the one or more processors cause the processors to:

allocate an indexed sequence of bits in a buffer for tracking a battery charging state, the indexed sequence of bits having a first number of bits;

sample a battery voltage of a rechargeable battery at a sampling rate;

for each sampled battery voltage:

compare the battery voltage with a voltage threshold;

identify a next bit position in the indexed sequence of bits; and in accordance with a determination that a comparison result is true, add a predefined first value to the next bit position in the indexed sequence of bits;

determine, in the indexed sequence of bits, a second number of bits that are filled with the predefined first value;

determine a ratio between the second number and the first number; and in accordance with a determination that the ratio exceeds a threshold step-down ratio, step down a battery charge voltage to which the rechargeable battery is charged to a step-down voltage.

16. The electronic device of claim 15, wherein the instructions further cause the one or more processors to:

determine whether the rechargeable battery is connected to a charger source, wherein the predefined first value is added to the next bit position in accordance with a determination that the comparison result is true and that the rechargeable battery is connected to the charger source; and for each sampled battery voltage, in accordance with a determination that the rechargeable battery is not connected to a charger source, add a predefined second value to the next bit position in the indexed sequence of bits.

17. The electronic device of claim 15, wherein the instructions that cause the one or more processors to identify the next bit position in the indexed sequence of bits further cause the one or more processors to:

in accordance with a determination that the indexed sequence of bits have been fully filled, identify the next bit position as a position of an earliest bit that has been filled in the indexed sequence of bits, wherein a value stored in the earliest bit is replaced by the predefined first value.

18. The electronic device of claim 15, wherein the indexed sequence of bits are filled and overwritten by samples of the battery voltage consecutively according to a predefined order.

19. The electronic device of claim 15, wherein the instructions further cause the one or more processors to:
for each sampled battery voltage, in accordance with a determination that the comparison result is false, adding a predefined second value distinct from the predefined first value in the next bit position in the indexed sequence of bits.

20. A non-transitory computer-readable medium, having instructions stored thereon, which when executed by one or more processors cause the processors to:
allocate an indexed sequence of bits in a buffer for tracking a battery charging state, the indexed sequence of bits having a first number of bits;
sample a battery voltage of a rechargeable battery at a sampling rate;
for each sampled battery voltage:
compare the battery voltage with a voltage threshold;
identify a next bit position in the indexed sequence of bits; and
in accordance with a determination that a comparison result is true, add a predefined first value to the next bit position in the indexed sequence of bits;
determine, in the indexed sequence of bits, a second number of bits that are filled with the predefined first value;
determine a ratio between the second number and the first number; and
in accordance with a determination that the ratio exceeds a threshold step-down ratio, step down a battery charge voltage to which the rechargeable battery is charged to a step-down voltage.

\* \* \* \* \*